Dec. 26, 1961 H. H. KAUFMANN 3,014,584
SEPARATOR
Filed Sept. 25, 1958 4 Sheets-Sheet 1

INVENTOR.
HENRY H. KAUFMANN
BY
ATTORNEYS

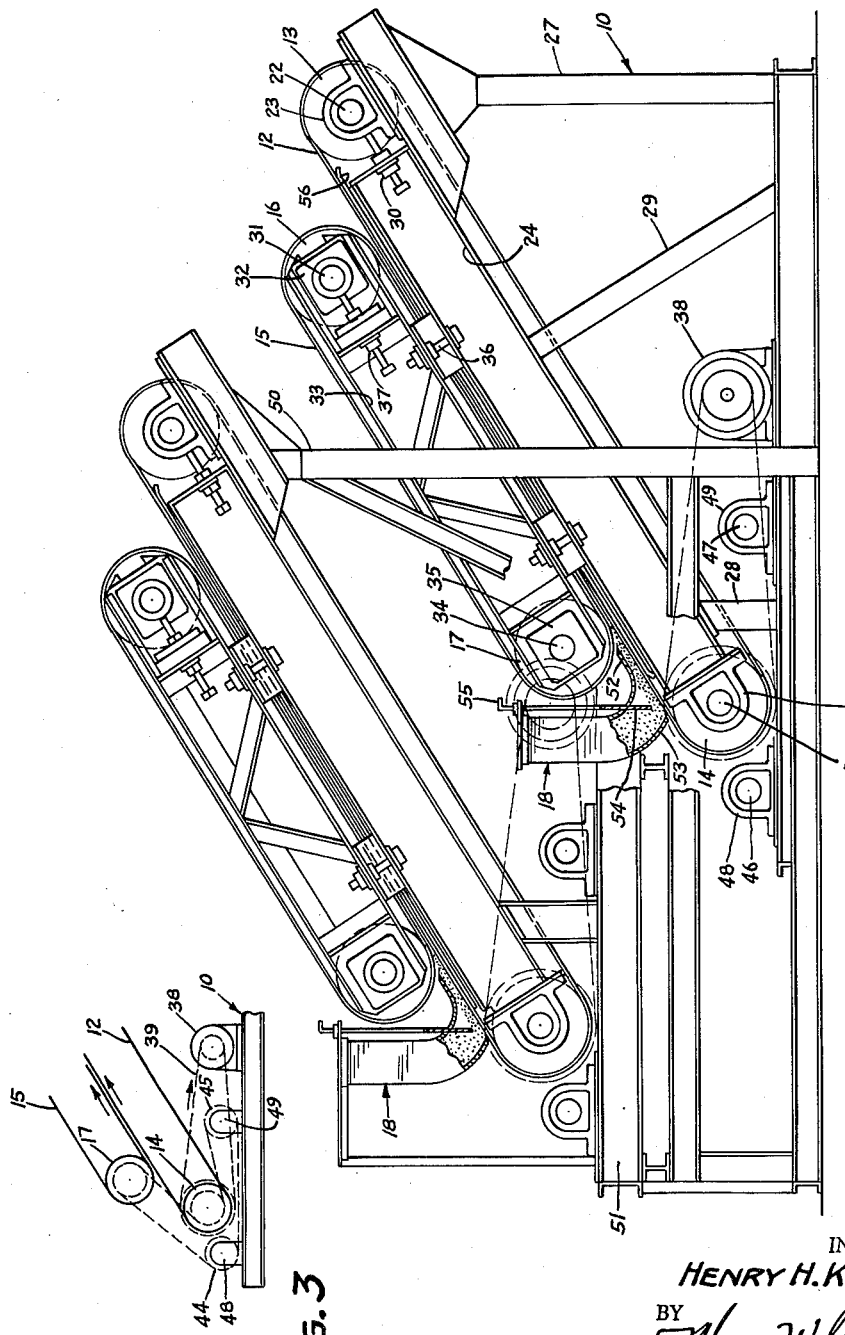

INVENTOR.
HENRY H. KAUFMANN
BY Moore, White & Burd
ATTORNEYS

United States Patent Office 3,014,584
Patented Dec. 26, 1961

3,014,584
SEPARATOR
Henry H. Kaufmann, St. Louis Park, Minn., assignor to Cargill, Incorporated, Minneapolis, Minn., a corporation of Delaware
Filed Sept. 25, 1958, Ser. No. 763,340
7 Claims. (Cl. 209—120)

This invention relates to a new and improved apparatus for effecting separation between particulate substances, such as between different cereal grains, the removal of contaminating substances from grain, and the like. More particularly, this invention relates to an apparatus for effecting separation between particulate substances by propelling the material forwardly into space and recovering fractions of the material in receiving receptacles positioned in relation to the ballistic characteristics of the particles comprising the fractions of the material to be separated.

For convenience, the apparatus of this invention will be described with particular reference to its use in cleaning grain. It is to be understood, however, that its utility is by no means so limited, but this invention is adapted for the separation of particulate materials generally.

It has been known for years to clean grain by projection from an inclined moving belt, but such cleaners are relatively inefficient, have small capacities, are limited in their types of separation and require substantial modification in change-over from one type of separation to another.

It is the principal object of this invention to provide a projection separation apparatus of greater versatility and increased capacity adjustable for adaptation to the separation of widely differing particulate substances without increase in floor space requirements.

It is a further object of this invention to provide a projection separation apparatus comprised of a plurality of projection units disposed in vertically spaced relation for simultaneous discharge into a common receiving area without detectable interference between the particle streams of the several units.

Another object of this invention is to provide a projection separation apparatus including a plurality of receiving hoppers having adjustable, movable wall panels between adjacent hoppers to vary the effective receiving capacities of the hoppers.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

FIGURE 2 is an enlarged and more detailed side elevation of the projection units comprising part of the separator apparatus;

FIGURE 3 is a schematic representation in side elevation showing the drive for the moving belts of the projection units;

Figure 1:
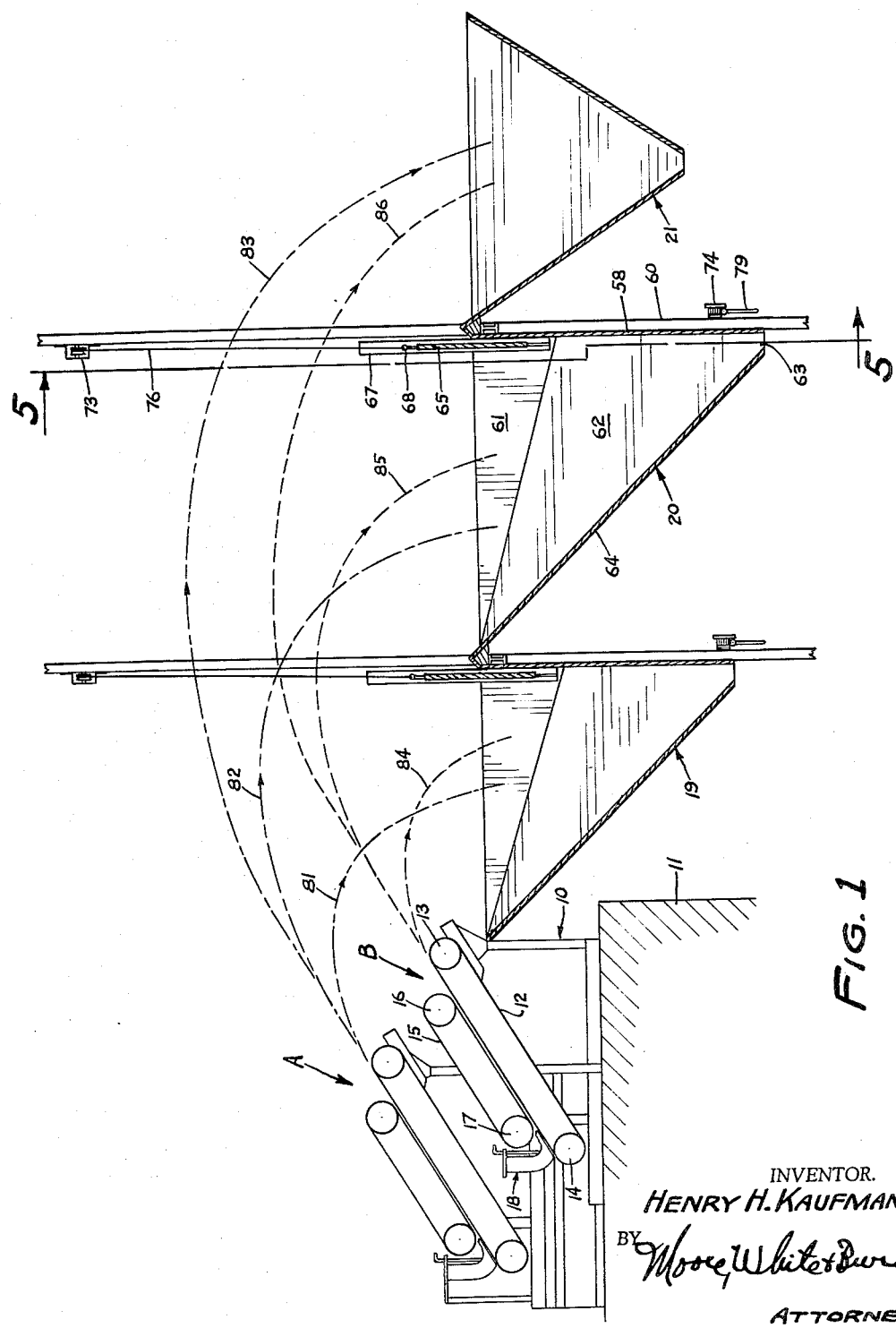
FIGURE 1 is a side elevation, partly in section, of the separation apparatus according to this invention including a pair of projection units and a plurality of receiving hoppers.
Figure 6:
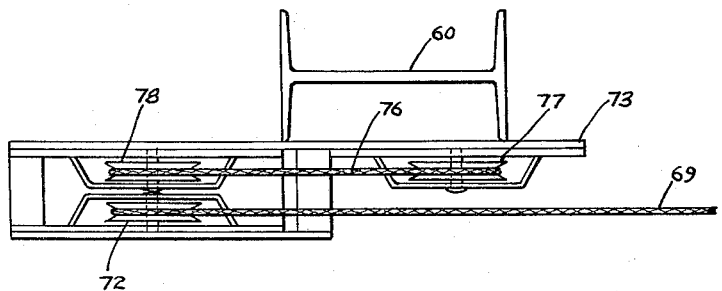
Figure 5:
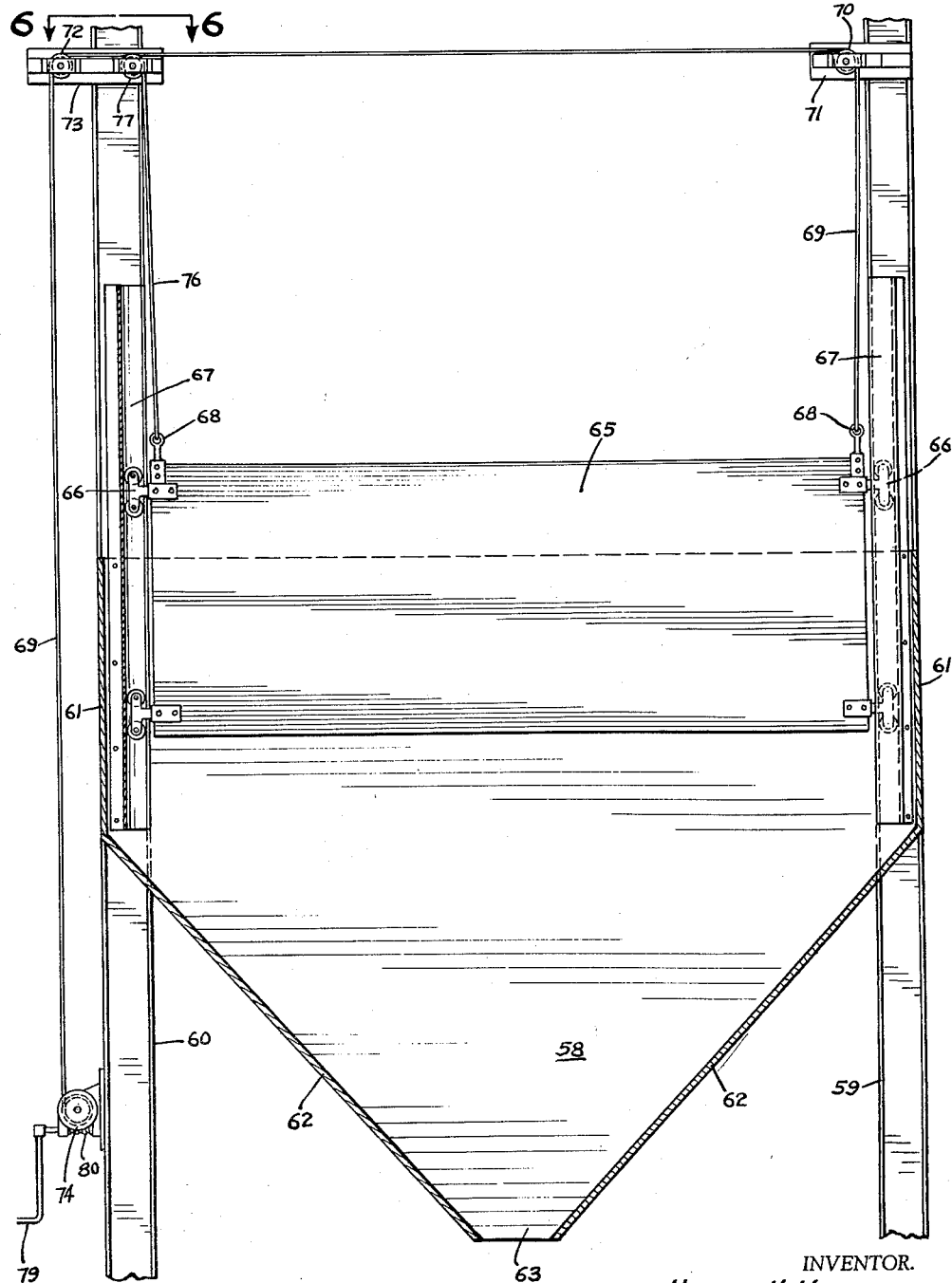

FIGURE 5 is an enlarged vertical section on the line 5—5 of FIGURE 1 and in the direction of the arrows, showing details of construction of the receiving hoppers and more particularly of the adjustable panels between adjacent hoppers; and FIGURE 6 is an enlarged horizontal section on the line 6—6 of FIGURE 5 and in the direction of the arrows showing the details of construction of the means by which the adjustable panels are vertically movable.

Broadly stated, the separator of the present invention comprises a plurality of stacked identical projection units and a plurality of receiving hoppers placed in front of the projection units. The projection units each comprise an adjustable feed hopper which feeds the material to be separated between two upwardly inclined belts which grip the material, carry it up at an angle and propel it into the air at the discharge end. The material upon discharge travels a shorter or longer distance depending upon its mass and/or shape and drops into the receiving hoppers. The several projection units operate in the same manner and are stacked in vertical spaced relation, the second being positioned above and slightly behind the first, etc. so that the throw patterns of the units are the same. This "piggy-back" arrangement unexpectedly allows increasing the separating capacity for a given floor area and a given set of receiving hoppers without adversely affecting the separating efficiency.

Figure 4:
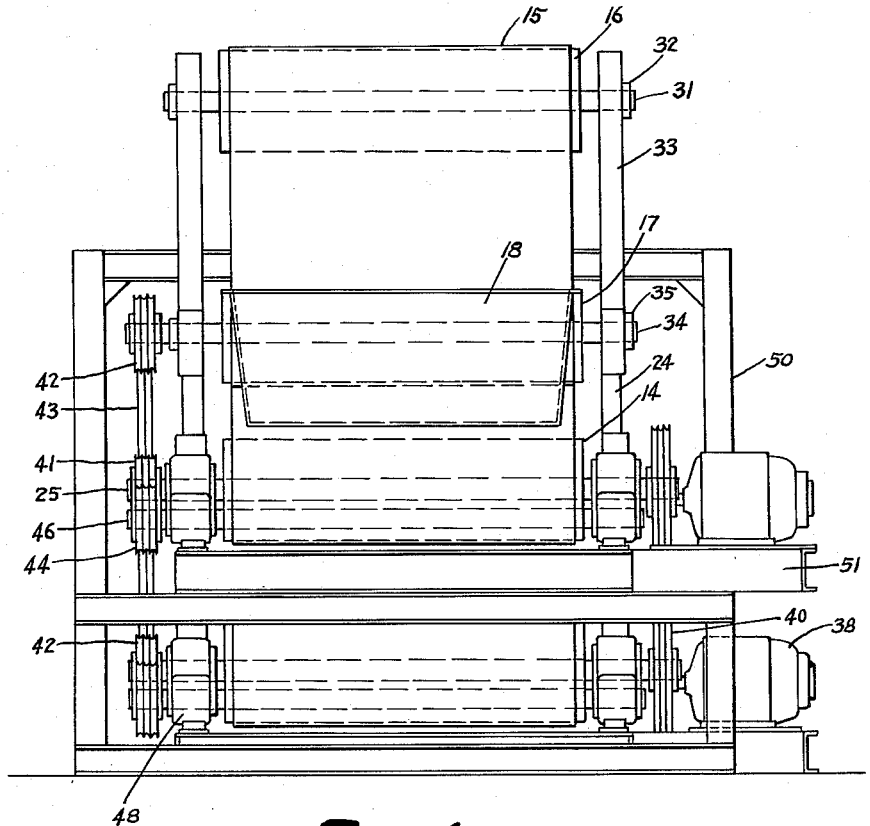
FIGURE 4 is an end elevation from the rear or loading end of the projection units.

Referring to the drawings, and particularly to FIGURES 1, 2 and 4, the separation apparatus according to this invention comprises a pair of like projection assemblies or units, indicated generally as A and B, supported in a rigid frame, indicated generally at 10, and mounted on a suitable supporting base 11. Unit A is positioned slightly above and to the rear of unit B.

The supporting framework 10 for the projection units must be rigid and heavy to avoid vibration which would interfere with even projection of grain from the units. The frame work must be securely mounted on the floor or other base.

Each projection unit includes a relatively wide flat rough surfaced lower endless belt 12 supported for movement between a pair of spaced apart parallel pulleys or rollers 13 and 14, and a similar somewhat shorter upper endless belt 15 supported between a pair of spaced apart parallel pulleys or rollers 16 and 17. The belt 15 is positioned generally directly above belt 12. The adjacent surfaces of the endless belts are spaced very slightly apart to permit a layer of the particulate material to be separated of single particle thickness to be carried between the belts. The adjacent surfaces of the upper and lower belts travel in the same direction at substantially the same rate and are inclined angularly upwardly in the forward direction. The material to be separated is discharged from a feed hopper, indicated generally at 18, onto lower belt 12 and then carried up between the belts 12 and 15 and propelled into the air at the upper discharge end and into one of a plurality of receiving hoppers, indicated generally at 19, 20 and 21, as shown in FIGURE 1.

Roller 13 is carried by shaft 22 journalled for rotation in a pair of bearing structures 23 each mounted on the upper end of an angularly inclined lower frame member 24. Roller 14 is similarly carried on a shaft 25 supported between a pair of bearing structures 26, each mounted on the lower end of one of the angularly inclined lower frame members 24. The frame members 24 are parallel and spaced apart at opposite ends of the rollers 13 and 14. The upper ends of the frame members 24 of the lower projection assembly B are supported by vertical members 27 of frame 10 and the lower ends are supported by vertical elements 28 of frame 10. Additional bracing 29 insures the rigidity of the frame structure. A pair of screw adjustments 30 permits relative movement between bearing structures 23 and the remainder of frame members 24 for regulation of the tension of belt 12.

Roller 16 is mounted on a shaft 31 supported between a pair of bearing structures 32 each of which is mounted on the upper end of an angularly inclined upper frame member 33. Similarly, roller 17 is mounted on shaft 34 supported between a pair of bearings 35 each mounted on the lower end of one of the upper frame members 33. The frame members 33 are parallel and spaced apart at the opposite ends of the rollers 16 and 17 and are parallel to and supported by the upper edges of the angularly inclined lower frame members 24. The upper frame members 33 are adjustably mounted by bolt means 36 or equivalent fastening means so that the space between the adjacent surfaces of endless belts 12 and 15 may be regulated. A pair of screw adjustments 37 permit relative movement between bearings 32 and the remainder of frame members 33 for control of the tension of endless belt 15.

The lower endless belt 12 of projection unit B is directly driven from the pulley of an electric motor 38 by a belt drive 39 to pulley 40 at one end of shaft 25. The upper endless belt 15 of that unit is driven indirectly by a belt drive 43 from a pulley 41 at the opposite end of shaft 25 to a pulley 42 at the end of shaft 34 and thence over idlers 44 and 45 which are supported on shafts 46 and 47, respectively, in turn supported between pairs of bearings 48 and 49, respectively, on the base of frame 10. The drive means is shown schematically in FIGURE 3.

The belts of the upper projection unit A are supported and driven in the same manner as already described for the lower projection unit B with the exception that it is supported higher in the frame 10 and rearwardly from unit B by means of longer vertical legs 50 supporting the upper ends of the frames 24, and a raised platform 51 at the feeding end of the frame 10 for supporting the lower ends of the frame members 24, the second electric motor, idlers, bearings, etc.

The feed hoppers 18 are supported in the frame 10 at the rear of the projection units. The open upper ends of the feed hoppers 18 are preferably supplied from conveyor or duct means, not shown. The open bottom end of each feed hopper is provided with a forwardly projecting extension 52 which extends along the longer lower belt 12 toward the nip between the endless belts 12 and 15 to prevent grain from escaping before it is gripped between the belts. The forward extension 52 is spaced slightly from the surface of the lower belt 12 in order that the roughened surface of the belt will draw a thin uniform layer of material from the hopper. The rear edge of the feed hopper 18 extends to the surface of the belt so as to permit the moving belt to just clear the bottom of the hopper while preventing spillage to the rear. The hopper at its open lower end is preferably tapered to a width narrower than that of the belts in order to avoid spillage of grain or other material gripped by the belts close to the belt edges. A slide gate 54 within the feed hopper serves to regulate the amount of grain fed onto the belt 12. The position of the gate is controlled by suitable adjusting means 55 to regulate the feed. Normally this is a layer one kernel thick and preferably covering less than the available belt area.

In each of the projection units the two belts 12 and 15 travel in the same direction at their adjoining surfaces and at the same speed. At rest, the belts are spaced about one-quarter inch apart but there is sufficient slack in them that their surfaces touch when in motion so that when grain is fed from the feed hopper, a uniform layer just one kernel thick is tightly gripped between the adjacent surfaces of the belts. The take-ups and height adjustments which are provided maintain proper distance and tension. A plate 56 is placed between the rollers 13 and 14, supported between the frame members 24 under the upper flight of the lower belt 12, to prevent sagging of this belt which would alter the spacing between the two belts.

The belts are driven to travel between about 1400 and 4800 feet per minute and preferably between about 2600 and 4200 feet per minute. Since the grain is gripped firmly between the two belts, it must necessarily travel at the belt speed before it is released at the upper discharge end. Air turbulence is minimized at the discharge end of the belts by placing the roller 16 carrying the upper belt inwardly with respect to the roller 13 carrying the lower belt. As an example, where the pulleys or rollers 13 and 14 are spaced apart 8 feet between center lines, the rollers 16 and 17 are desirably spaced 5 feet between center lines with the centerline of roller 16 being spaced inwardly a foot and one-half from the center line of roller 13.

The frame members 24 carrying the belt supporting structure are preferably pivotally mounted at one end so that the angle of inclination may be varied. The belts may be inclined at an angle between about 25 and 35 degrees from the horizontal with the optimum inclination being about 29 degrees.

Care must be taken that the belts 12 and 15 run exactly on top of each other and that the feed hopper 18 is centered on the belts. The use of sideboards to hold the belts in alignment is unsatisfactory due to the friction generated at high belt speeds. For this reason, dynamically balanced rollers and pulleys, prestretched belts with diagonal splices, and careful adjustment of belt tension are used to insure proper belt alignment. The velocity the grain attains on the belt is high enough to align all of the kernels immediately in the most favorable direction upon leaving the belt. This is important since precise separation depends upon all of the particles having the same initial velocity.

As the grain leaves the upper end of the belt 12 it is propelled or projected into essentially still air and is there subject to several forces. At low speeds, relatively lighter particles have less tendency to continue in their paths and will drop out of the stream sooner than heavier particles. At high speeds, the drag forces of the air predominate and will cause aerodynamically shaped particles to fly farther. By suitable variation of rate of material feed and belt speed and angle, any combination of these forces can be made to act on the particles and produce the desired separation.

For the purpose of effecting the desired separation, a plurality of receiving hoppers 19, 20 and 21 are provided. The receiving hoppers are placed on or built into the floor in front of the projection units aligned one behind the other. The number of hoppers corresponds to the number of fractions of the original feed material desired. The relative sizes and placement of the receiving hoppers also depends upon the fractions desired to be recovered although it has been found that permanently installed receiving hoppers of substantially uniform receiving area may be adapted to provide a variety of separations without the necessity of varying the sizes or placement of the hoppers.

Although varying slightly in size and construction, hoppers 19, 20 and 21 are generally similar in having a relatively wide rectangular receiving mouth and tapering side walls terminating in a relatively narrow bottom opening discharging to an elevator leg, screw conveyor, bin, duct, etc. Hopper 20 is exemplary and includes a vertical backwall 58 supported between a pair of frame members 59 and 60. The hopper has a pair of sidewalls having vertical upper portions 61 and sloping lower portions 62 tapering toward a discharge opening 63 at the bottom. A sloping front wall 64 extends from the top of the hopper to the discharge. An adjustable vertical wall or panel member 65 is vertically movable adjacent the vertical backwall 58 of the hopper. The opposite ends of the panel 65 are provided with suitable roller guide means 66 which move in cooperation with channel guide members 67 supported from the inside walls of the hopper to guide and control the movement of the movable panel. By adjustment of the movable panel 65 the effective height of the back wall of the hopper may be varied and the stream of particles which is deposited in the hopper controlled thereby.

The upper surface of the movable panel 65 is provided with a pair of eyelets 68 or similar line fastening means. A line or cable 69 extends from the right hand eyelet 68 vertically upward to a pulley 70 supported in a bracket 71 mounted on the frame member 59. The line or cable 69 extends over the pulley 70 horizontally to a pulley 72 supported in a bracket 73 mounted on frame member 60 and thence vertically downward to one pulley 74 of a winch, also supported on the frame member 60. A similar line or cable 76 extends vertically upward from the left hand eyelet 68 over a pulley 77 mounted in the bracket 73 and thence horizontally over pulley 78 in bracket 73 and downwardly to the other winch pulley. The free ends of the lines 69 and 76 are secured to the winch pulleys 74. When the crank 79 of the winch is turned the gear mechanism 80 of the winch causes the winch pulleys to rotate at a uniform rate in the same direction so that, as the line is taken in or let out, the vertical panel member 65 is moved evenly upwardly or downwardly to vary the effective height of the backwall of the hopper.

The trajectories of the particles propelled from each of the projection units are shown in diagrammatic and greatly simplified form in FIGURE 1. Thus, the trajectory from upper projection unit A is shown in dot and dash lines and the trajectories from lower projection unit B are shown in dash lines. For illustration, it will be seen that the particles propelled from projection unit A follow generally three paths indicated at 81, 82 and 83 representing three different fractions of material. Similarly, the particles projected from projection unit B follow three paths indicated as 84, 85 and 86 representing the same fractions of material. It will be understood that the particles for the most part would not follow sharply defined paths as illustrated, but, instead, there would be a myriad of paths, each determined by the size, shape, density, etc. of each particle. However, particles of generally like characteristics will tend to follow generally the same trajectory so that all of the generally like particles will comprise one fraction of the material and will be recovered in one of the receiving hoppers.

The number of receptacles provided depends upon the number of fractions desired to be recovered from the feed material. In the case of grain, for example, the grain might well be contaminated with lighter waste materials, such as chaff, and heavier material, such as sand, soil, etc. In this event, three receptacles would be provided. The lighter waste material would be collected in one receiving hopper, the heavier waste material would be collected in another receiving hopper and the desired clean grain would be recovered in an intermediate hopper. The waste fractions would comprise a small percentage of the total feed material and would be discarded, whereas the recovered grain fraction would comprise the major proportion of the feed and be transferred from the receiving hopper for use. In other instances, it might be desired to recover all of the fractions for use. For example, a feed mixture might be composed of grain of mixed grades and qualities which are desired to be separated. In this event, all of the feed material would be recovered for use in as many separate fractions as desired.

The effective receiving capacities of the hoppers may be varied by raising and lowering the vertically movable wall panels 65. For example, if the wall panel is raised, it intercepts the trajectories of particles which would otherwise fall into a succeeding receiving hopper farther removed from the projection units. These particles now strike against the movable panel and fall into the receiving hopper short of their normal trajectory. By this means, a single set of receiving hoppers may be adapted to separate a variety of different fractions of feed material. In this manner, the separator of this invention may be adapted to changing conditions without the necessity of moving either the projection units or the receiving hoppers.

Quite unexpectedly, the particle streams from one projection unit pass through the particle streams from the other projection unit and into the receiving hoppers without any detectable interference between the particle streams. It will be seen, for example, that the particles comprising one fraction of material and following generally the trajectory path indicated at 81 from the upper projection unit A pass through the particle streams from the lower projection unit B following the trajectory paths indicated at 85 and 86, become intermingled with the particles comprising the same fraction following trajectory path 84 and drop into the receiving hopper 19. In like manner, for example, the particles from lower projection unit B following generally the trajectory path indicated at 86 must pass through both the streams of particles from the upper projection unit A following generally the paths indicated at 81 and 82. In both instances, these crossings of the particle streams are accomplished without interference of one with another. This unexpected result permits the "piggy-back" arrangement of projection units which allows multiplication of separator capacity for a given floor area and single set of receiving hoppers.

Although the invention is described with particular reference to the use of two projection units, further capacity may be introduced by the addition of other units stacked in the same manner slightly above and behind the one below it so that the throw patterns are the same.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A separator for particulate material comprising a plurality of stacked particle projection units and a receiving hopper means disposed before said projection units, each of said projection units comprising a cooperating pair of endless belts each mounted between a pair of parallel rollers for adjacent surfaces of both belts to travel together upwardly along an angularly inclined path, means for feeding a thin layer of particulate material between said belts and means for driving said belts at high speed to project said particulate material forwardly therefrom, said particle projection units simultaneously discharging into said receiving hopper means.

2. A separator according to claim 1 further characterized in that the surfaces of said endless belt are rough textured for securely gripping particulate material.

3. A separator according to claim 1 further characterized in that the uppermost of said endless belts of each of said projection units is shorter than the lowermost endless belt and the rollers supporting said shorter belt are spaced inwardly with respect to the rollers supporting the longer belt.

4. A separator according to claim 1 further characterized in that each of said feed hoppers is open at the bottom, has a width less than the width of said belts and is provided with a forwardly projecting extension positioned between grain as it feeds and the rear of the upper belt, spaced from the surface of the lower belt and extending toward the nip between the upper and lower belts.

5. A separator for particulate material comprising a plurality of stacked particle projection units and a plurality of receiving hoppers disposed before said projection units; each of said projection units comprising a cooperating pair of endless belts disposed one above the other for adjacent surfaces of both belts to travel together, each of said belts being supported between a pair of parallel rollers mounted in angularly inclined frame members, the uppermost of said endless belts being shorter than the lowermost endless belt and the rollers supporting said shorter belt being spaced inwardly with respect to the rollers supporting the longer belt, both of said endless belts being rough textured for securely gripping particulate material; hopper means for feeding a thin layer of particulate material between the belts of both of said projection units, each of said feed hoppers being open at the bottom having a width less than the width of said belts and being provided with a forwardly projecting extension positioned between grain as it feeds and the rear of the upper belt, spaced from the surface of the lowermost belt and extending toward the nip between the upper and lower belts; means for driving said belts at high speed to project said particulate material forwardly from said belts into said receiving hoppers; each successisve projection unit being positioned above and behind the projection unit immediately preceding it whereby the throw patterns of the projection units are substantially the same; at least one of said receiving hoppers including a vertical back wall supported between two vertical frame members, a movable wall panel extending between said frame members guided by vertical guide means, said movable panel being supported in said guide means by line means and said line means being connected to winch means for raising and lowering said panel member.

6. A separator according to claim 5 further characterized in that two projection units are provided in stacked relation, the second being mounted slightly above and to the rear of the first.

7. In a separator for particulate material including a particle projection unit and a feed hopper means disposed before said projection unit, said projection unit comprising a pair of endless belts, each mounted between a pair of parallel rollers for adjacent surfaces of both belts to travel together upwardly along an angularly inclined path, means for feeding a thin layer of particulate material between said belts and means for driving said belts at high speed to project said particulate material forwardly from said belts into the receiving hoppers, the improvement comprising said feed hopper being open at the bottom, having a width less than the width of said belts and being provided with a forwardly projecting extension positioned between said grain feeding means and the rear of said upper belt, spaced from the surface of the lowermost belt and extending toward the nip between the upper and lower belts.

References Cited in the file of this patent

UNITED STATES PATENTS

| 2,684 | Wilson | June 22, 1842 |
| 974,395 | Kidder | Nov. 1, 1910 |
| 1,078,520 | Stromberg | Nov. 11, 1913 |
| 1,228,143 | Shockley | May 29, 1917 |
| 1,356,384 | Marshall | Oct. 19, 1920 |
| 1,568,618 | Pforr | Jan. 5, 1926 |
| 2,394,922 | Levy | Feb. 12, 1946 |

FOREIGN PATENTS

| 19,059 | Great Britain | 1893 |
| 27,252 | Norway | Feb. 25, 1913 |